(12) United States Patent
Itadani et al.

(10) Patent No.: US 10,487,944 B2
(45) Date of Patent: Nov. 26, 2019

(54) SLIDE COMPONENT

(71) Applicant: EAGLE INDUSTRY CO., LTD., Minato-ku, Tokyo (JP)

(72) Inventors: Masatoshi Itadani, Tokyo (JP); Kazumasa Sunagawa, Tokyo (JP); Keiichi Chiba, Tokyo (JP); Kenji Kiryu, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 15/544,496

(22) PCT Filed: Jan. 26, 2016

(86) PCT No.: PCT/JP2016/052139
§ 371 (c)(1),
(2) Date: Jul. 18, 2017

(87) PCT Pub. No.: WO2016/121739
PCT Pub. Date: Aug. 4, 2016

(65) Prior Publication Data
US 2018/0010690 A1  Jan. 11, 2018

(30) Foreign Application Priority Data

Jan. 31, 2015 (JP) ................. 2015-018014

(51) Int. Cl.
*F16J 15/40* (2006.01)
*F16J 15/16* (2006.01)
(Continued)

(52) U.S. Cl.
CPC ............ *F16J 15/164* (2013.01); *F04D 29/10* (2013.01); *F16J 15/3412* (2013.01)

(58) Field of Classification Search
CPC ........ F16J 15/164; F16J 15/34; F16J 15/3412; F04D 29/08; F04D 29/10
See application file for complete search history.

(56) References Cited

U.S. PATENT DOCUMENTS

| 4,406,466 A * | 9/1983 | Geary, Jr. ............ F16J 15/3412 |
| | | 277/347 |
| 5,385,409 A * | 1/1995 | Ide ....................... F16J 15/3432 |
| | | 277/400 |

(Continued)

FOREIGN PATENT DOCUMENTS

| JP | H11236976 A | 8/1999 |
| JP | WO2012046749 A1 | 2/2014 |

(Continued)

OTHER PUBLICATIONS

International Search Report (ISR) dated Mar. 8, 2016, issued for International application No. PCT/JP2016/052139.

*Primary Examiner* — Gilbert Y Lee
(74) *Attorney, Agent, or Firm* — Law Office of Katsuhiro Arai (57) ABSTRACT

In an embodiment, in a slide component, a negative pressure generation mechanism 12 that generates negative pressure by relative rotational sliding of a stationary-side seal ring 5 and a rotating-side seal ring 3 is provided on a sealing face of one of the stationary-side seal ring 5 and the rotating-side seal ring 3, and at least the surface of the negative pressure generation mechanism 12 is covered by an adhesion-resistant material film 15. With the configuration, deposition of precipitates on a negative pressure portion of a sealing face can be inhibited.

7 Claims, 8 Drawing Sheets

(51) Int. Cl.
*F04D 29/10* (2006.01)
*F16J 15/34* (2006.01)

(56) References Cited

U.S. PATENT DOCUMENTS

| | | | | |
|---|---|---|---|---|
| 5,447,316 | A * | 9/1995 | Matsui | F16J 15/3412 277/400 |
| 2005/0212217 | A1* | 9/2005 | Tejima | F16J 15/3412 277/399 |
| 2013/0209011 | A1* | 8/2013 | Tokunaga | F16C 17/045 384/123 |
| 2014/0217676 | A1* | 8/2014 | Hosoe | F16J 15/3412 277/350 |
| 2015/0115537 | A1* | 4/2015 | Tokunaga | F16J 15/348 277/348 |
| 2015/0167847 | A1* | 6/2015 | Tokunaga | F16J 15/3412 277/400 |
| 2015/0184752 | A1* | 7/2015 | Itadani | F16J 15/3412 277/400 |
| 2015/0226334 | A1* | 8/2015 | Itadani | F16J 15/3412 277/400 |
| 2015/0226335 | A1* | 8/2015 | Takahashi | F16J 15/363 277/393 |
| 2015/0260292 | A1* | 9/2015 | Inoue | F16J 15/3412 277/400 |
| 2015/0377297 | A1 | 12/2015 | Tokunaga et al. | |
| 2015/0377360 | A1* | 12/2015 | Itadani | F16J 15/3412 277/400 |
| 2016/0033045 | A1* | 2/2016 | Itadani | F16J 15/348 277/348 |
| 2016/0252182 | A1* | 9/2016 | Itadani | F16J 15/3412 277/401 |
| 2018/0010690 | A1 | 1/2018 | Itadani et al. | |

FOREIGN PATENT DOCUMENTS

| | | |
|---|---|---|
| JP | WO2014061544 A1 | 9/2016 |
| JP | WO2014103631 A1 | 1/2017 |
| JP | WO2014112455 A1 | 1/2017 |
| JP | WO2014148316 A1 | 2/2017 |
| JP | WO2014174725 A1 | 2/2017 |
| WO | 2016121739 A1 | 8/2016 |

* cited by examiner

FIG.5A  REVERSE RAYLEIGH STEP MECHANISM

FIG.5B  MODIFIED REVERSE RAYLEIGH STEP MECHANISM

FIG.5C  MODIFIED REVERSE RAYLEIGH STEP MECHANISM

SLIDE COMPONENT

This application is the U.S. National Phase under 35 U.S.C. § 371 of International Application PCT/JP2016/052139, filed Jan. 26, 2016, which claims priority to Japanese Patent Application No. 2015-018014, filed Jan. 31, 2015. The International Application was published under PCT Article 21(2) in a language other than English.

TECHNICAL FIELD

The present invention relates to slide components suitable for, for example, mechanical seals, bearings, and other slide units. In particular, the present invention relates to slide components such as seal rings or bearings that require friction reduction by interposing a fluid between sealing faces as well as prevention of fluid leakage from the sealing faces.

BACKGROUND ART

A mechanical seal, an example of a slide component, is evaluated for its performance by a leakage rate, a wear rate, and torque. In conventional arts, by optimizing the seal material and the sealing face roughness of mechanical seals, their performance is improved to achieve low leakage, long life, and low torque. However, due to growing awareness of environmental problems in recent years, a further improvement in the performance of mechanical seals has been demanded, for which technology development beyond the limits of the conventional arts has been required.

To respond to this, the present applicant and others have developed mechanical seals with surface texture such as Rayleigh steps, reverse Rayleigh steps, reverse spiral grooves, or U-shaped or nano-level projections and depressions used on a sealing face in order to achieve a tradeoff between torque reduction and leakage rate reduction in slide components such as mechanical seals (see Patent Documents 1, 2, and 3, for example).

It has heretofore been confirmed that in a mechanical seal of a water pump used for cooling a water-cooled engine, for example, an additive in LLC, a type of antifreeze, such as silicate or phosphate (hereinafter, referred to as a "deposit formation-causing substance") can be concentrated on a sealing face, forming deposits as time passes, and degrading the function of the mechanical seal. The deposit formation is considered to be a phenomenon that occurs likewise in mechanical seals of apparatuses that handle chemicals or oils.

The present inventors' study has confirmed in experiments that in a mechanical seal in which surface texture is used, negative pressure can be generated in a sealing face due to its characteristics, and a sealed fluid entering the sealing face evaporates due to the negative pressure, causing excessive precipitation and formation of a deposit formation-causing substance, and formation of deposits at an accelerated rate, so that the function of the mechanical seal may be degraded. Further, a concentrated and evaporated fluid leaking to the outside of the sealing face can be brought back by negative pressure, thereby being deposited on the sealing face.

For the prevention of deposit formation on a sealing face, the present applicant has filed a patent application earlier for an invention that reduces negative pressure at low pressure fluid-side ends of pumping grooves (portions upstream of a fluid flow associated with a relative movement to an opposing sealing face) communicating with the high-pressure fluid side for forcing a sealed fluid back to the high-pressure fluid side to prevent the occurrence of evaporative cavitation, and thereby to prevent formation of precipitates at the low pressure fluid-side ends of the pumping grooves (see Patent Document 4).

The applicant has also filed a patent application for an invention in which, in a slide component with fluid discharge means for discharging a fluid to the high-pressure fluid side, a buffer groove for reducing the entry of a low-pressure fluid into the high-pressure fluid side is provided in a sealing face on the low-pressure side of the fluid discharge means, and the buffer groove constitutes a buffer for the low-pressure fluid entering the sealing face from the low-pressure fluid side against a high-pressure fluid, to delay the time before the sealing face is filled with the low-pressure fluid (e.g., air), and to prevent the dehydration and condensation reaction of the high-pressure fluid (see Patent Document 5).

CITATION LIST

Patent Document

Patent Document 1: WO 2012/046749 A1
Patent Document 2: WO 2014/112455 A1
Patent Document 3: WO 2014/148316 A1
Patent Document 4: WO 2014/103631 A1
Patent Document 5: WO 2014/174725 A1

SUMMARY OF THE INVENTION

Problem to be Solved by the Invention

However, the inventions described in Patent Documents 4 and 5 require the provision of a new groove(s) in a sealing face in order to prevent formation of deposits of a deposit formation-causing substance on the sealing face. However, the provision of a groove(s) for preventing deposit formation in a sealing face reduces the area of a sealing portion, and poses a problem that the contact pressure of the sealing face increases, to accelerate wear.

The present invention has an object of providing a slide component improved in the sealing function of a sealing face by preventing the deposition of precipitates on a negative-pressure portion, thereby preventing adhesion of deposits to a land portion even when a sealed fluid entering the sealing face by the negative pressure of the sealing face evaporates, causing the precipitation and formation of a deposit formation-causing substance.

Means for Solving Problem

[Principles]

In the present invention, attention is focused on the characteristics of soil resistance and low adhesion of an adhesion-resistant material, and the surface of a negative pressure generation mechanism on which deposits tend to be precipitated and formed is covered by a film of an adhesion-resistant material to prevent deposits from being deposited on the surface of the negative pressure generation mechanism, and to prevent the adhesion of deposits to a sealing face, so as to improve the sealing function of the sealing face. Of adhesion-resistant material films, a diamond-like carbon film, in particular, has excellent characteristics including high hardness, high wear resistance, a low friction coefficient, high chemical stability, and high seizure resistance.

It is to be noted that, in the present invention, the adhesion-resistant material is a material having soil resistance and low adhesion against a deposit formation-causing substance, and means a material of one of diamond-like carbon (DLC), diamond, fluororesin (PTFE), fluorine, titanium nitride (TiN), and a silicon resin.

[Means]

To attain the above object, a slide component according to a first aspect of the present invention includes an annular stationary-side seal ring fixed to a stationary side, and an annular rotating-side seal ring that rotates with a rotating shaft, the slide component causing opposed sealing faces of the stationary-side seal ring and the rotating-side seal ring to rotate relative to each other, thereby sealing a high-pressure fluid present on one side, as viewed in a radial direction, of the sliding sealing faces rotatable relative to each other, in which a negative pressure generation mechanism that generates negative pressure by relative rotational sliding of the stationary-side seal ring and the rotating-side seal ring is provided on the sealing face of one of the stationary-side seal ring and the rotating-side seal ring, and at least a surface of the negative pressure generation mechanism is covered by a film of an adhesion-resistant material.

According to this aspect, even when a deposit formation-causing substance is precipitated due to the negative pressure of the negative pressure generation mechanism, the soil resistance and the low adhesion of the adhesion-resistant material film can prevent precipitates from depositing on the surface of the negative pressure generation mechanism, which in turn prevents adhesion of deposits to a land portion, so that a slide component improved in the sealing function of a sealing face can be provided.

According to a second aspect of the present invention, in the slide component according to the first aspect, the negative pressure generation mechanism includes a dimple formed in the sealing face.

According to this aspect, it is possible to prevent precipitates from depositing on the surface of the dimple constituting the negative pressure generation mechanism, which in turn prevents adhesion of deposits to a land portion, so that a slide component improved in the sealing function of a sealing face can be provided.

According to a third aspect of the present invention, in the slide component according to the first aspect, the negative pressure generation mechanism is formed in the sealing face, and includes a pumping groove that discharges a fluid entering the sealing face to a high-pressure fluid side.

According to this aspect, it is possible to prevent precipitates from depositing on the surface of a low pressure fluid-side end of the pumping groove constituting the negative pressure generation mechanism, which in turn prevents adhesion of deposits to a land portion, so that a slide component improved in the sealing function of a sealing face can be provided.

According to a fourth aspect of the present invention, in the slide component according to the first aspect, the negative pressure generation mechanism is provided to be located on a low-pressure side of the sealing face, and includes a negative pressure generation groove that communicates with a high-pressure fluid side and is separated from a low-pressure fluid side by a land portion.

According to this aspect, in the one in which leakage of a fluid from the high-pressure fluid side to the low-pressure fluid side can be effectively prevented, it is possible to prevent precipitates from depositing on the surface of the negative pressure generation groove constituting the negative pressure generation mechanism, which in turn prevents adhesion of deposits to the land portion, so that a slide component improved in the sealing function of a sealing face can be provided.

According to a fifth aspect of the present invention, in the slide component according to the fourth aspect, the negative pressure generation mechanism includes a reverse Rayleigh step mechanism.

According to this aspect, in the one with the reverse Rayleigh step mechanism suitable as the negative pressure generation mechanism that can be formed on a sealing face of a slide component, it is possible to prevent precipitates from depositing on the surface of the reverse Rayleigh step mechanism constituting the negative pressure generation mechanism, which in turn prevents adhesion of deposits to the land portion, so that a slide component improved in the sealing function of a sealing face can be provided.

According to a sixth aspect of the present invention, in the slide component according to the fourth aspect, the negative pressure generation mechanism includes a reverse spiral groove.

According to this aspect, in the one with the reverse spiral groove suitable as the negative pressure generation mechanism that can be formed on a sealing face of a slide component, it is possible to prevent precipitates from depositing on the surface of the reverse spiral groove constituting the negative pressure generation mechanism, which in turn prevents adhesion of deposits to the land portion, so that a slide component improved in the sealing function of a sealing face can be provided.

Effect of the Invention

The present invention achieves the following outstanding effects.

(1) As at least the surface of the negative pressure generation mechanism is covered by the adhesion-resistant material film, even when a deposit formation-causing substance is precipitated due to the negative pressure of the negative pressure generation mechanism, the soil resistance and the low adhesion of the adhesion-resistant material film can prevent precipitates from depositing on the surface of the negative pressure generation mechanism, which in turn prevents adhesion of deposits to the land portion, so that a slide component improved in the sealing function of a sealing face can be provided.

(2) It is possible to prevent precipitates from depositing on the surface of the dimple constituting the negative pressure generation mechanism, which in turn prevents adhesion of deposits to the land portion, so that a slide component improved in the sealing function of a sealing face can be provided.

(3) It is possible to prevent precipitates from depositing on the surface of the pumping groove constituting the negative pressure generation mechanism, which in turn prevents adhesion of deposits to the land portion, so that a slide component improved in the sealing function of a sealing face can be provided.

(4) In the one in which leakage of a fluid from the high-pressure fluid side to the low-pressure fluid side can be effectively prevented, it is possible to prevent precipitates from depositing on the surface of the negative pressure generation groove constituting the negative pressure generation mechanism, which in turn prevents adhesion of deposits to the land portion, so that a slide component improved in the sealing function of a sealing face can be provided.

(5) In the one with the reverse Rayleigh step mechanism suitable as the negative pressure generation mechanism that can be formed on a sealing face of a slide component, it is possible to prevent precipitates from depositing on the surface of the reverse Rayleigh step mechanism constituting the negative pressure generation mechanism, which in turn prevents adhesion of deposits to the land portion, so that a slide component improved in the sealing function of a sealing face can be provided.

(6) In the one with the reverse spiral groove suitable as the negative pressure generation mechanism that can be formed on a sealing face of a slide component, it is possible to prevent precipitates from depositing on the surface of the reverse spiral groove constituting the negative pressure generation mechanism, which in turn prevents adhesion of deposits to the land portion, so that a slide component improved in the sealing function of a sealing face can be provided.

DESCRIPTION OF EMBODIMENTS

Hereinafter with reference to the drawings, forms for implementing this invention will be described illustratively based on embodiments. However, the dimensions, materials, shapes, relative arrangements, and others of components described in the embodiments are not intended to limit the scope of the present invention only to them unless otherwise described explicitly.

First Embodiment

With reference to FIGS. 1 to 5(c), a slide component according to a first embodiment of the present invention will be described.

It is to be noted that, in the present embodiment, a mechanical seal, an example of the slide component, will be described as an example. The outer peripheral side of slide components constituting the mechanical seal is described as the high-pressure fluid side (sealed fluid side), and the inner peripheral side as the low-pressure fluid side (atmosphere side). However, the present invention is not limited to this, and is also applicable to a case where the high-pressure fluid side and the low-pressure fluid side are reversed.

Figure 1:
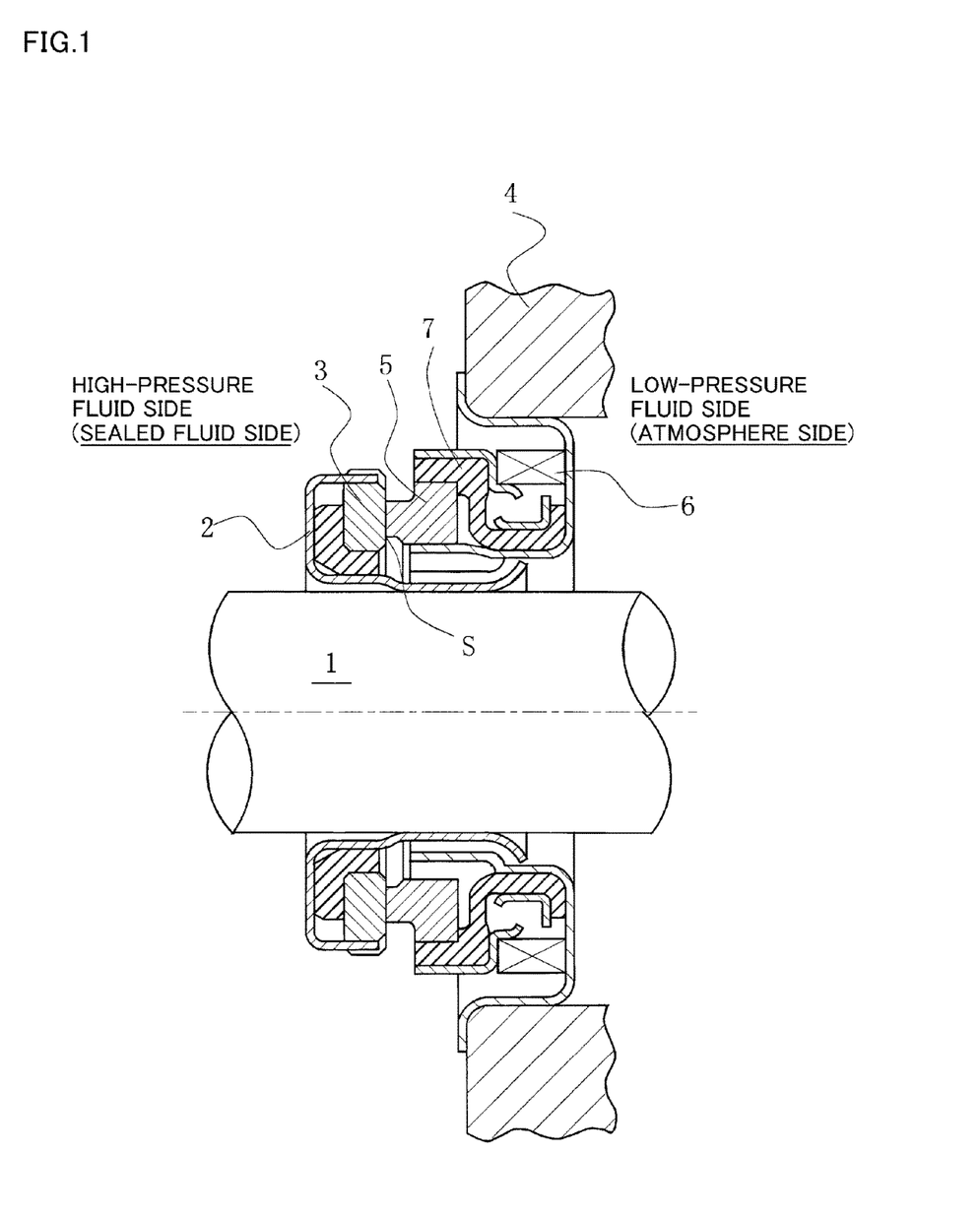
FIG. 1 is a vertical cross-sectional view showing an example of a mechanical seal according to a first embodiment of the present invention.

FIG. 1 is a vertical cross-sectional view showing an example of the mechanical seal, which is an inside mechanical seal in a form of sealing a sealed fluid on the high-pressure fluid side trying to leak from the outer periphery of sealing faces toward the inner periphery. The mechanical seal is provided, on the side of a rotating shaft 1 to drive a pump impeller (not shown) on the high-pressure fluid side, with an annular rotating-side seal ring 3, one slide component, provided in a state of being integrally rotatable with the rotating shaft 1 via a sleeve 2, and at a pump housing 4, with an annular stationary-side seal ring 5, the other slide component, provided in a state of being non-rotatable and axially movable. By a coiled wave spring 6 and a bellows 7 axially biasing the stationary-side seal ring 5, the rotating-side seal ring 3 and the stationary-side seal ring 5 slide in close contact with each other on sealing faces S mirror-finished by lapping or the like. That is, the mechanical seal prevents the sealed fluid from flowing out from the outer periphery of the rotating shaft 1 to the atmosphere side at the respective sealing faces S of the rotating-side seal ring 3 and the stationary-side seal ring 5.

Figure 2:
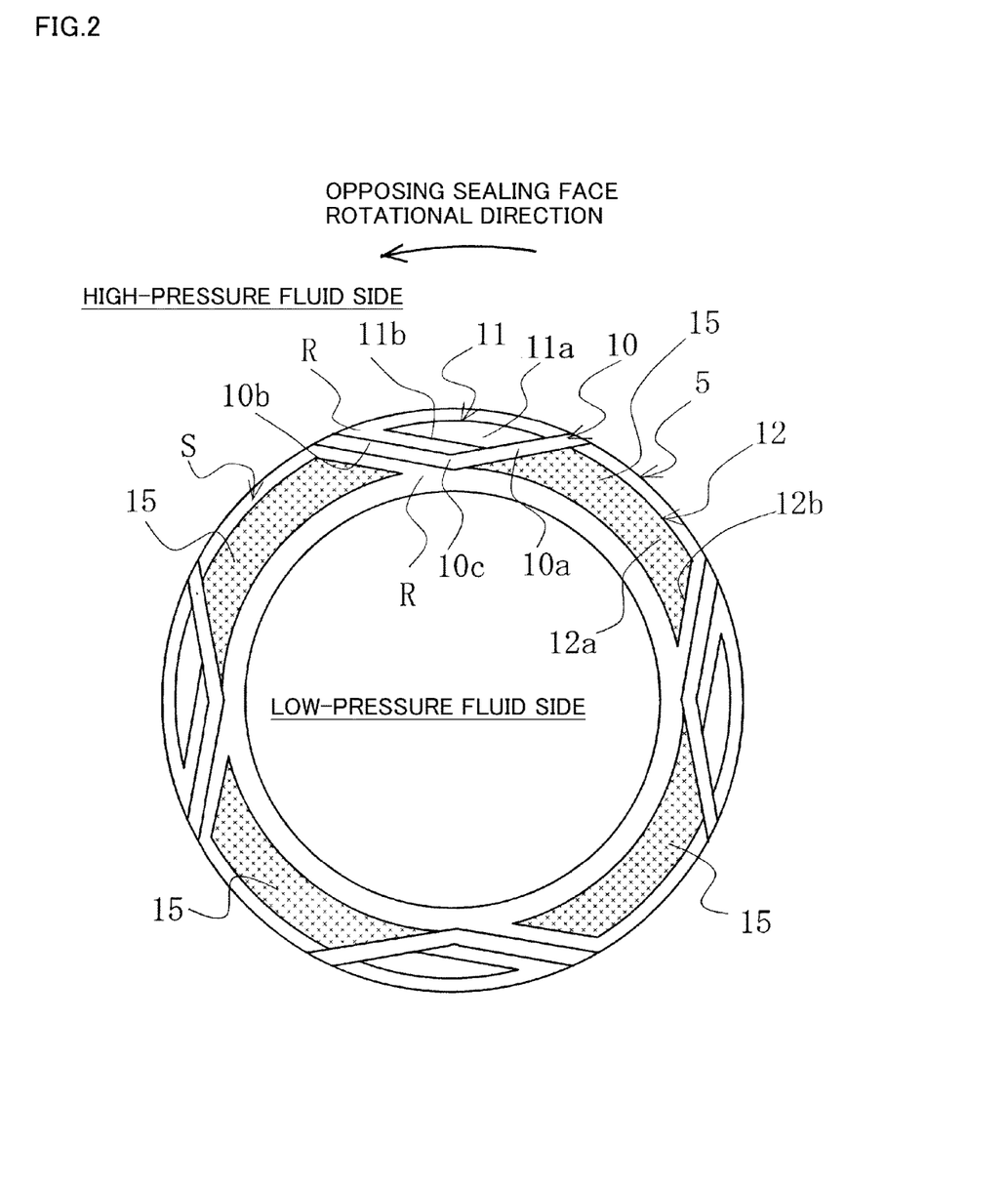
FIG. 2 shows a sealing face of a slide component according to the first embodiment of the present invention.

FIG. 2 shows a sealing face of a slide component according to the first embodiment of the present invention, for illustrating a case where a negative pressure generation mechanism is provided on the sealing face of the stationary-side seal ring 5 in FIG. 1 as an example.

The same applies to a case where a negative pressure generation mechanism is provided on the sealing face of the rotating-side seal ring 3.

In FIG. 2, assume that the outer peripheral side of the sealing face S of the stationary-side seal ring 5 is the high-pressure fluid side, the inner peripheral side is the low-pressure fluid side, e.g., the atmosphere side, and the opposing sealing face rotates in a counterclockwise direction.

In the sealing face of the stationary-side seal ring 5, four fluid circulation grooves 10 communicating with the high-pressure fluid side and separated from the low-pressure fluid side by a smooth portion R (sometimes referred to as a "land portion" in the present invention) of the sealing face S are provided at equal angular intervals.

The fluid circulation grooves 10 each include an inlet portion 10a for an entry from the high-pressure fluid side, an outlet portion 10b for an exit to the high-pressure fluid side, and a connection portion 10c circumferentially connecting the inlet portion 10a and the outlet portion 10b, and are separated from the low-pressure fluid side by the land portion R. The fluid circulation grooves 10 each have the function of actively introducing a sealed fluid from the high-pressure fluid side onto the sealing face and discharging it in order to prevent a fluid containing corrosion products or the like from being concentrated on the sealing face, and are formed with the inlet portion 10a and the outlet portion 10b to facilitate introducing the sealed fluid onto the sealing face and discharging it in accordance with the rotation direction of the opposing sealing face, and on the other hand, are separated from the low-pressure fluid side by the land portion R to reduce leakage. In this embodiment, the inlet portion 10a and the outlet portion 10b are formed in a linear shape oriented radially from the center of the sealing face, but are not particularly limited to this. The inclination of the inlet portion 10a and the outlet portion 10b may be further increased, and may be formed in a curved shape (such as an arc shape) instead of a linear shape. The width and the depth of each fluid circulation groove 10 are set optimally according to the pressure, the type (viscosity), and others of the sealed fluid.

On the sealing face in which the fluid circulation grooves 10 are provided, positive pressure generation mechanisms 11 including positive pressure generation grooves 11a shallower than the fluid circulation grooves 10 are provided in portions enclosed by the fluid circulation grooves 10 and the high-pressure fluid side. The positive pressure generation mechanisms 11 are intended to generate positive pressure (dynamic pressure), thereby promoting the formation of a fluid film between the sealing faces and improving lubrication performance.

The positive pressure generation grooves 11a communicate with the inlet portions 10a of the fluid circulation grooves 10, and are separated from the outlet portions 10b and the high-pressure fluid side by the land portions R.

In this embodiment, the positive pressure generation mechanisms 11 are each formed from the positive pressure generation groove 11a communicating with the inlet portion 10a of the fluid circulation groove 10, and a Rayleigh step mechanism having a Rayleigh step 11b, but are not limited to this, and may be formed by a femto-groove with a dam, for example. It is only essential that each be a mechanism to generate positive pressure.

In FIG. 2, the sealing face of the stationary-side seal ring 5 is further provided with reverse Rayleigh step mechanisms 12 constituting negative pressure generation mechanisms on the outside of the portions enclosed by the fluid circulation grooves 10 and the high-pressure fluid side, that is, on the radially low-pressure side of the sealing face between the adjacent fluid circulation grooves 10, 10. The reverse Rayleigh step mechanisms 12 include grooves 12a constituting negative pressure generation grooves shallower than the fluid circulation grooves 10, and reverse Rayleigh steps 12b. The grooves 12a are separated from the low-pressure fluid side by a land portion R, and communicate with the inlet portions 10a of the fluid circulation grooves 10 downstream. The upstream reverse Rayleigh steps 12b are separated from the upstream fluid circulation grooves 10 by the land portion R.

In the first embodiment, the reverse Rayleigh step mechanisms 12 constituting the negative pressure generation mechanisms have the function of introducing a sealed fluid trying to leak from the high-pressure fluid side to the low-pressure fluid side due to the generation of negative pressure into the grooves 12a, and returning it to the high-pressure fluid side via the fluid circulation grooves 10, to improve sealing performance, and prevent leakage between adjacent fluid circulation grooves 10 and 10, portions where the Rayleigh step mechanisms 11 are not provided, to improve the sealing performance of the entire sealing face.

The reverse Rayleigh step mechanisms 12 will be described below in detail.

The numbers of the fluid circulation grooves 10, the Rayleigh step mechanisms 11, and the reverse Rayleigh step mechanisms 12 evenly spaced, and the ratio in length between the Rayleigh step mechanisms 11 and the reverse Rayleigh step mechanisms 12 can be selected optimally as appropriate.

The depths and the widths of the fluid circulation grooves 10, the positive pressure generation grooves 11a of the positive pressure generation mechanisms 11, and the grooves 12a of the reverse Rayleigh step mechanisms 12 are of a type determined appropriately according to the diameter, the sealing face width, and the relative movement speed of the sealing part, the conditions of sealing and lubrication, and others.

As an example, when the diameter of the slide component is about 20 mm, and the sealing face width is about 2 mm, the widths of the positive pressure generation grooves 11a and the grooves 12a are 0.4 to 0.6 mm, the depths are some hundredths of nanometers to 1 μm, and the width of a sealing surface 16 on the inner peripheral side is 0.2 to 0.4 mm. The width of the fluid circulation grooves 10 is a width adequate for circulating a high-pressure fluid, and the depth is some tens of micrometers to some hundreds of micrometers.

As the grooves 12a of the reverse Rayleigh step mechanisms 12 are under negative pressure, a sealed fluid entering the grooves 12a evaporates, causing a deposit formation-causing substance to be excessively precipitated and formed, deposit in the grooves 12a, and adhere to and deposit on the land portion R, which becomes a factor in reducing the sealing performance.

Therefore, in the present embodiment, the surfaces of the grooves 12a are covered by a diamond-like carbon film (also referred to as a "DLC film") 15.

The diamond-like carbon film 15 is formed by CVD method (a chemical vapor deposition method) or PVD method (a physical vapor deposition method), or a spattering method or an ion plating method, or the like.

DLC material is amorphous, and its carbon-carbon bonding form includes both the diamond structure (sp3 bonding) and graphite bonding (sp2 bonding). For example, a-C (amorphous carbon) consisting only of carbon elements, a-C:H (hydrogenated amorphous carbon) containing hydrogen, MeC partly containing a metal element such as titanium (Ti) or molybdenum (Mo), and the like can be used.

When the thickness of the diamond-like carbon film 15, which is not particularly limited, is set to about 0.5 μm, for example, since the depth of the grooves 12a is some micrometers, it does not affect the negative pressure generation of the reverse Rayleigh step mechanisms 12.

The formed diamond-like carbon film has a very smooth surface compared to a hard thin film of a polycrystalline structure since it does not have grain boundaries due to its amorphous structure.

The diamond-like carbon film has excellent characteristics including high hardness, high wear resistance, a low friction coefficient, high chemical stability, and high seizure resistance. In the present embodiment, attention is focused, in particular, on the characteristics of soil resistance and low adhesion of the diamond-like carbon film. The surfaces of the negative pressure generation mechanisms on which deposits tend to be precipitated and formed are covered by the diamond-like carbon film to prevent precipitates from adhering to and being deposited on the surfaces of the negative pressure generation mechanisms, and to prevent the adhesion of deposits to the sealing face, so as to improve the sealing function of the sealing face.

Figure 3:
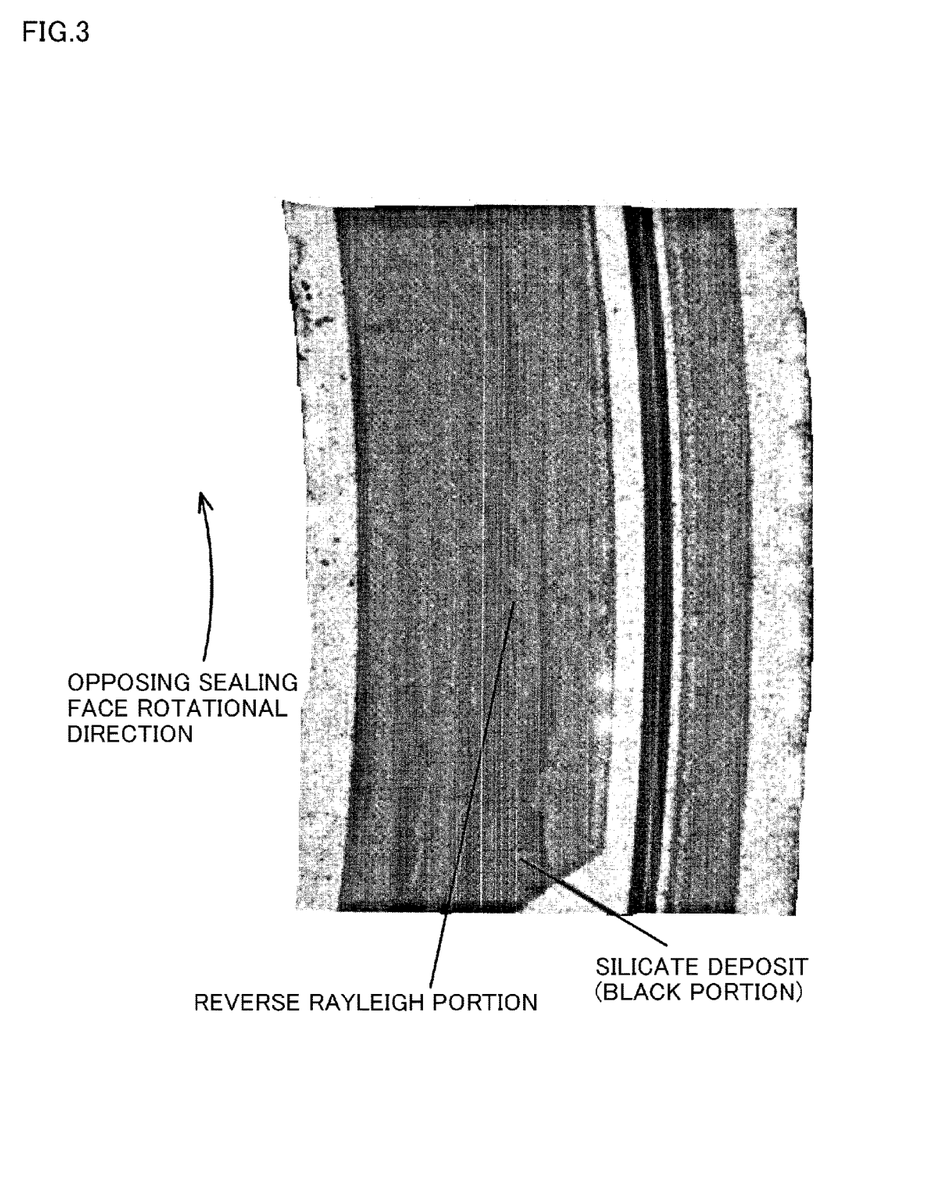
FIG. 3 is a photograph showing the condition of a sealing face provided with negative pressure generation grooves when a seal test was performed on a sealed fluid containing a deposit formation-causing substance, using a slide component not covered by a diamond-like carbon film.

FIG. 3 is a photograph showing the condition of a sealing face provided with the reverse Rayleigh step mechanisms 12 when a seal test was performed on a sealed fluid containing a deposit formation-causing substance, using a slide component with the grooves 12a of the reverse Rayleigh step mechanisms 12 not covered by the diamond-like carbon film 15.

It is a photograph of the sealing face provided with the negative pressure generation grooves, taken in an air-blown state after water was run on it at the end of the seal test. The deposition of precipitates was found on the grooves 12a and the land portion. The height of the deposit was about 5 μm.

Figure 4:
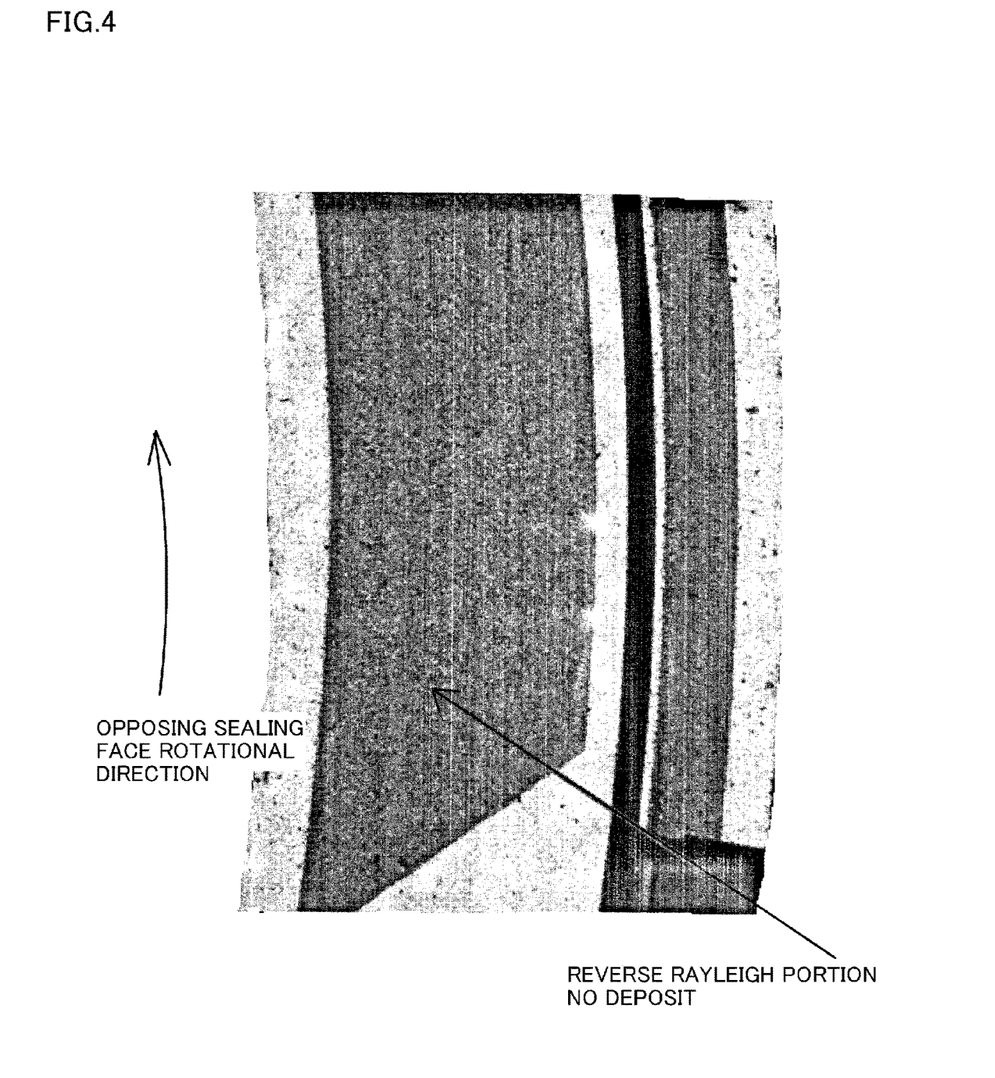
FIG. 4 is a photograph showing the condition of a sealing face provided with negative pressure generation grooves when a seal test was performed on a sealed fluid containing a deposit formation-causing substance, using a slide component covered by a diamond-like carbon film.

FIG. 4 is a photograph showing the condition of a sealing face provided with the reverse Rayleigh step mechanisms 12 when a seal test was performed on a sealed fluid containing a deposit formation-causing substance, using a slide component with the grooves 12a of the reverse Rayleigh step mechanisms 12 covered by the diamond-like carbon film 15.

It is a photograph of the sealing face provided with the reverse Rayleigh step mechanisms 12, taken in an air-blown state after water was run on it at the end of the seal test. No deposition of precipitates was found on the grooves 12a and the land portion R.

As described above, when the grooves 12a of the reverse Rayleigh step mechanisms 12 are not covered by the diamond-like carbon film 15, the deposition of the deposit formation-causing substance was found on the surfaces of the grooves 12a and the land portion R, while when the grooves 12a of the reverse Rayleigh step mechanisms 12 are covered by the diamond-like carbon film 15, no deposition of the deposit formation-causing substance was found on the surfaces of the grooves 12a and the land portion R. This is possibly because even when the deposit formation-causing substance is precipitated due to the negative pressure of the reverse Rayleigh step mechanisms 12, the soil resistance and the low adhesion of the diamond-like carbon film 15 prevent precipitates from adhering to and depositing on the surfaces of the grooves 12a, whereby presumably preventing the deposition of the precipitates on the land portion R as well as the grooves 12a.

Here, referring to FIGS. 5(a) to 5(c), the reverse Rayleigh step mechanisms 12 will be described.

Figures 5, 5A:
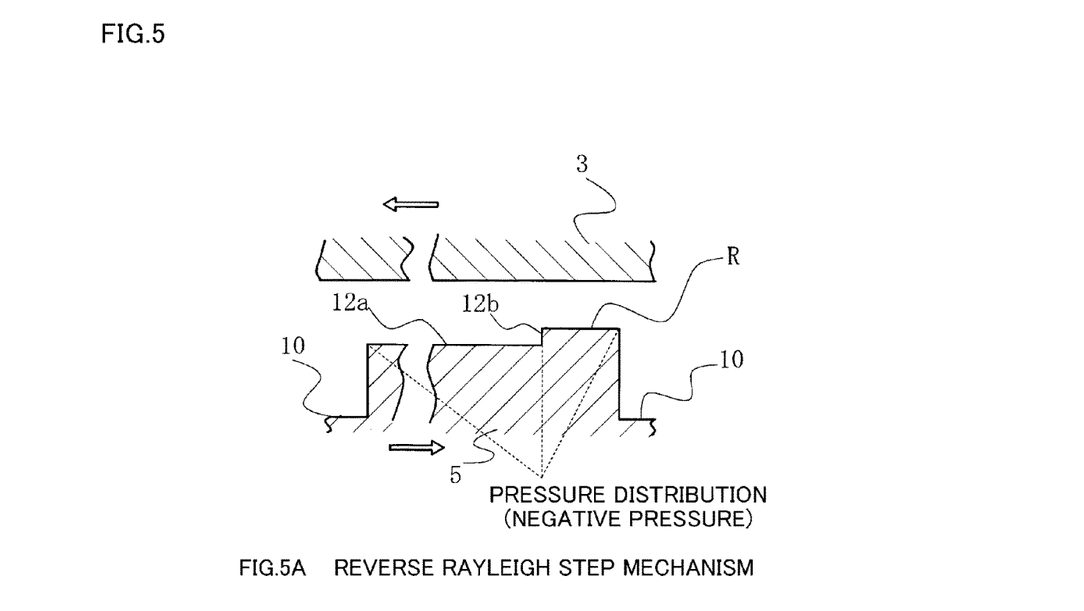
FIGS. 5(a) to 5(c) are diagrams illustrating a reverse Rayleigh step constituting a part of a negative pressure generation mechanism according to the first embodiment.

In FIG. 5(a), assume that, as shown by arrows, the rotating-side seal ring 3 rotates in a clockwise direction, and the opposing stationary-side seal ring 5 rotates in a counterclockwise direction relative to the rotating-side seal ring 3. On the sealing face S of the stationary-side seal ring 5, a reverse Rayleigh step 12b (spreading step) is formed facing downstream and perpendicularly to the directions of relative movements of rotating-side seal ring 3 and stationary-side seal ring 5, and a groove 12a is formed downstream of the reverse Rayleigh step 12b. The sealing face of the opposing rotating-side seal ring 3 is flat.

When the rotating-side seal ring 3 and the stationary-side seal ring 5 relatively move in the directions shown by the arrows, a fluid interposed between the sealing faces S of the seal rings 3 and 5 tries to follow and move in the movement direction of the seal ring 3 or 5 due to its viscosity, thus generating dynamic pressure (negative pressure) at that time as shown by broken lines due to the presence of the reverse Rayleigh step 12b.

Figure 5B:
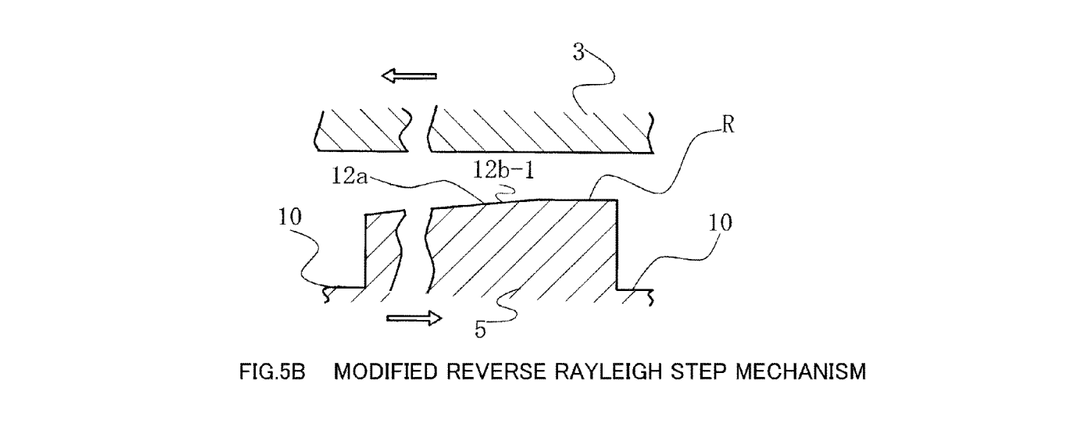
Figure 5C:
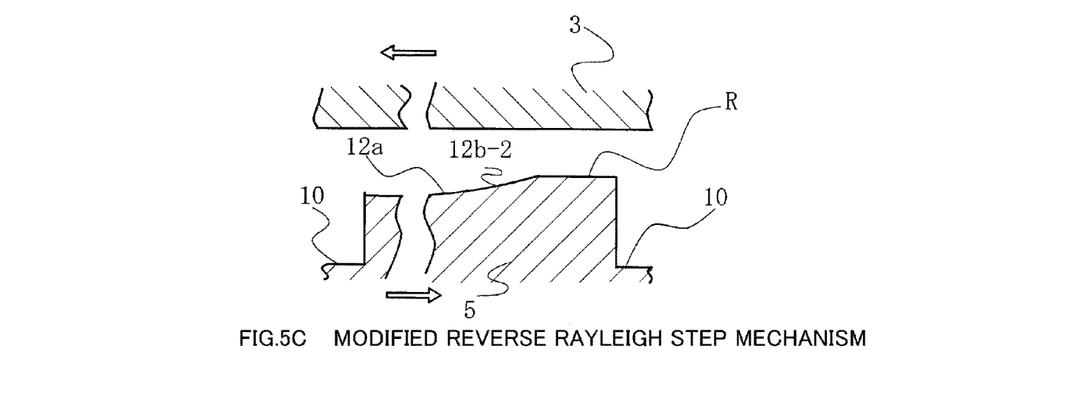

In FIG. 5(b), the reverse Rayleigh step 12b in FIG. 5(a) is changed in shape to a linear inclined surface 12b-1. In FIG. 5(c), the reverse Rayleigh step 12b in FIG. 5(a) is changed in shape to a curved inclined surface 12b-2. Configurations in FIGS. 5(b) and 5(c) also generate substantially the same negative pressure as in FIG. 5(a). In the present invention, mechanisms in FIGS. 5(b) and 5(c) are referred to as modified reverse Rayleigh step mechanisms, and are included in reverse Rayleigh steps.

As described above, the slide component according to the first embodiment includes the annular stationary-side seal ring 5 fixed to a stationary side, and the annular rotating-side seal ring 3 that rotates with the rotating shaft 1, the slide component causing the opposed sealing faces of the stationary-side seal ring 5 and the rotating-side seal ring 3 to rotate relatively, thereby sealing a high-pressure fluid present on one sides, as viewed in a radial direction of the sliding sealing faces rotatable relative to each other, in which the reverse Rayleigh step mechanisms 12 constituting the negative pressure generation mechanisms that generate negative pressure by relative rotational sliding of the stationary-side seal ring 5 and the rotating-side seal ring 3 are provided on the sealing face of one of the stationary-side seal ring 5 and the rotating-side seal ring 3, the reverse Rayleigh step mechanisms 12 are provided to be located on the low-pressure side of the sealing face, and include the grooves 12a constituting negative pressure generation grooves that communicate with the high-pressure fluid side and are separated from the low-pressure fluid side by the land portion R, and the surfaces of the reverse Rayleigh step mechanisms 12 are covered by the diamond-like carbon film 15, so that even when a deposit formation-causing substance is precipitated due to the negative pressure of the reverse Rayleigh step mechanisms 12, the soil resistance and the low adhesion of the diamond-like carbon film 15 can prevent precipitates from depositing on the surfaces of the grooves 12a, which in turn prevents adhesion of deposits to the land portion R, so that a slide component improved in the sealing function of a sealing face can be provided.

Second Embodiment

Figure 6:
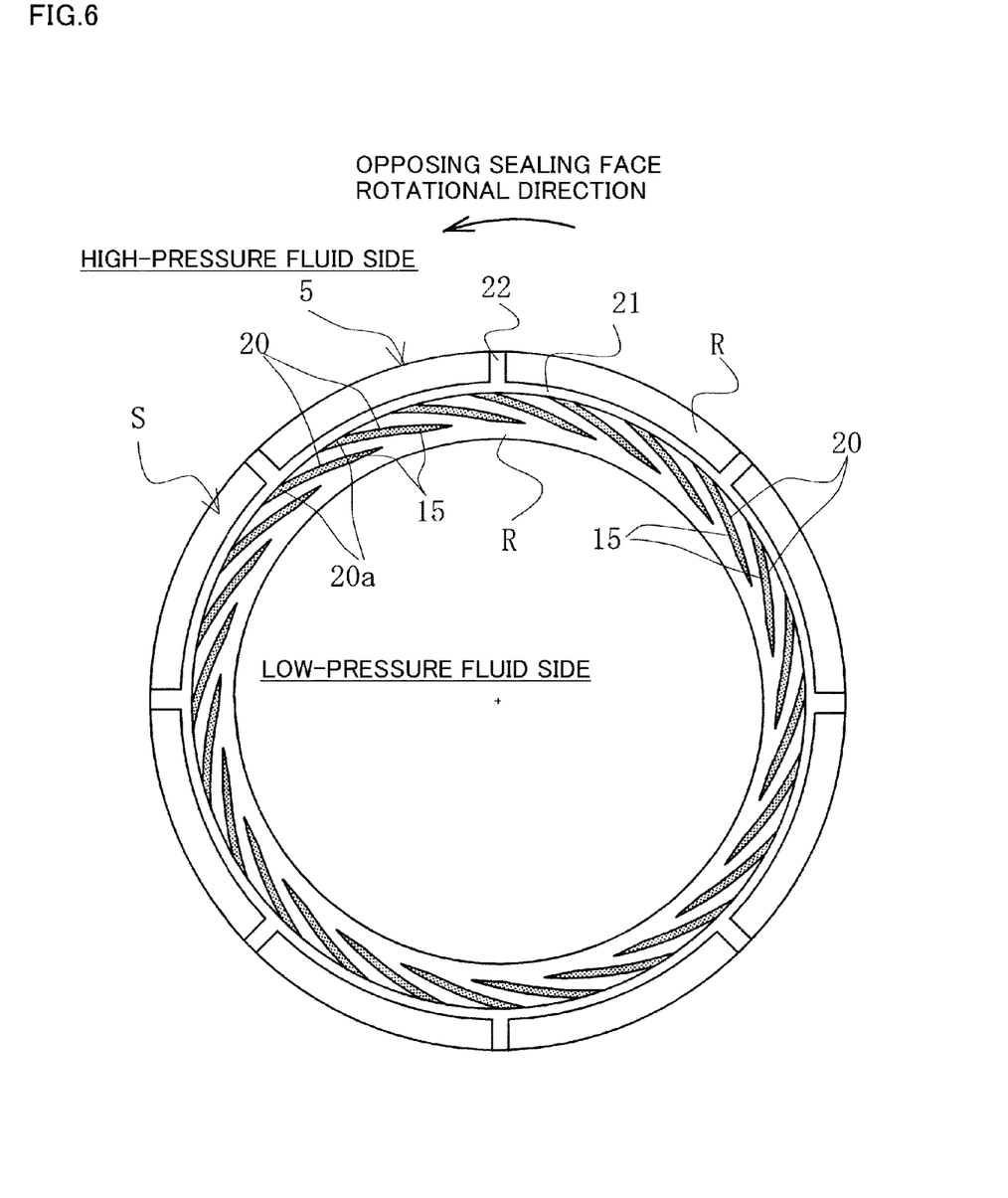
FIG. 6 is a diagram showing reverse spiral grooves constituting negative pressure generation mechanisms according to a second embodiment of the present invention.

With reference to FIG. 6, a slide component according to a second embodiment of the present invention will be described.

In FIG. 6, the same numerals and letters as those in the first embodiment denote the same members as those in the first embodiment to omit overlapping descriptions.

In FIG. 6, reverse spiral grooves 20 constituting negative pressure generation mechanisms do not directly communicate with the low-pressure fluid side, and are separated therefrom by a land portion R. The reverse spiral grooves 20 are provided over the entire perimeter of a sealing face of a stationary-side seal ring 5. High pressure-side ends 20a of the reverse spiral grooves 20 communicate with a pressure release groove 21. The pressure release groove 21 is partly connected to the high-pressure fluid side via radial grooves 22. By relative rotational motion to the opposing sealing face, the reverse spiral grooves 20 generate negative pressure, acting to suck in a fluid leaking from the high pressure-side fluid, and force back the fluid to the high-pressure fluid side through the pressure release groove 21 connected to the high-pressure fluid side. Cavitation occurs in the reverse spiral grooves 20, precipitates form in the reverse spiral grooves 20, and the precipitates adhere to and deposit on the reverse spiral grooves 20 and the land portion R, which becomes a factor in reducing sealing performance.

Therefore, the reverse spiral grooves 20 are covered by a diamond-like carbon film 15 identical to that in the first embodiment.

As the surfaces of the reverse spiral grooves 20 constituting the negative pressure generation mechanisms are covered by the diamond-like carbon film 15, even when a deposit formation-causing substance is precipitated due to the negative pressure of the reverse spiral grooves 20, the soil resistance and the low adhesion of the diamond-like carbon film 15 prevent precipitates from depositing on the surfaces of the reverse spiral grooves 20 and adhering to the land portion R, so that a slide component improved in the sealing function of a sealing face can be provided.

Third Embodiment

Figure 7:
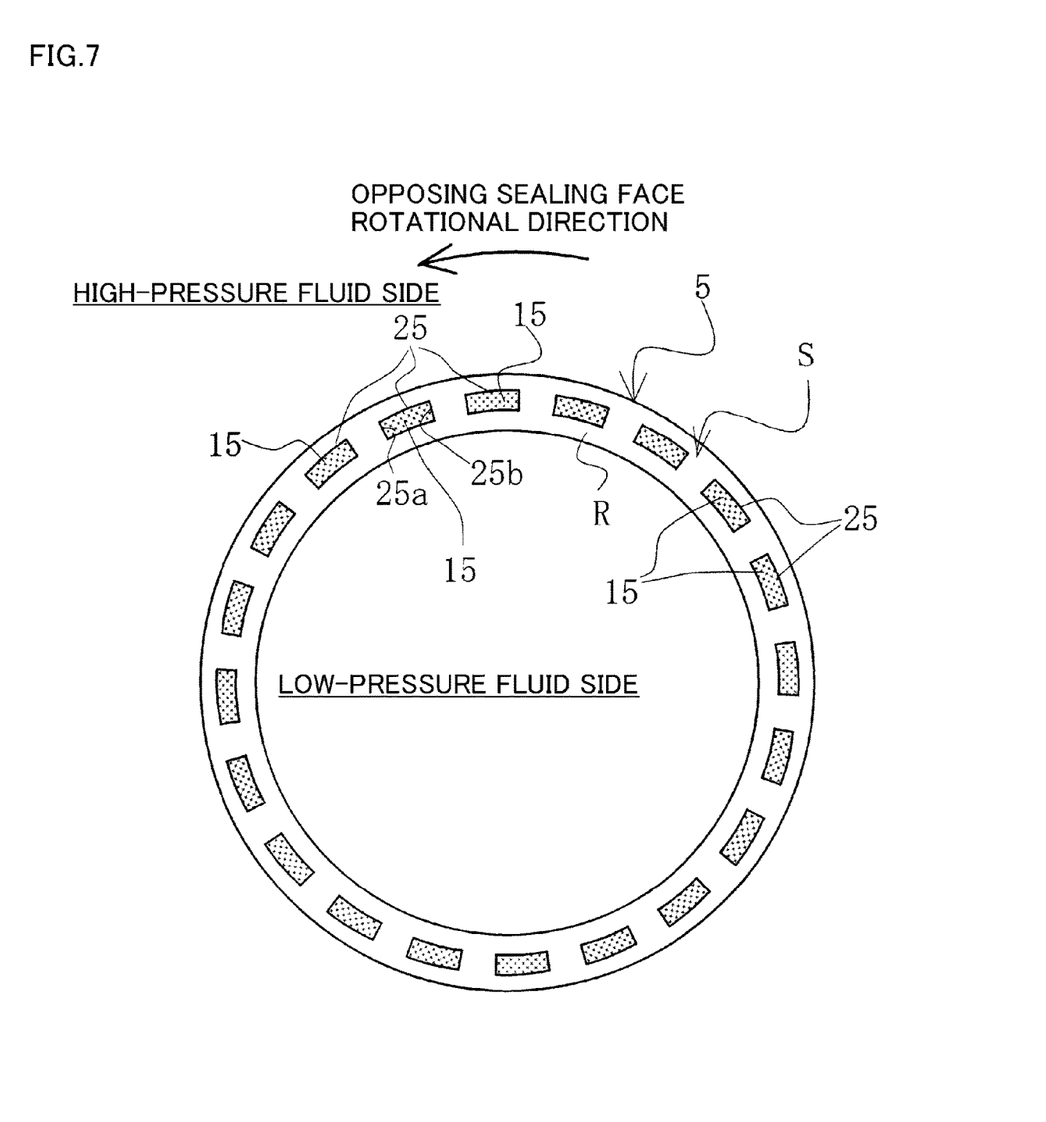
FIG. 7 is a diagram showing dimples constituting negative pressure generation mechanisms according to a third embodiment of the present invention.

With reference to FIG. 7, a slide component according to a third embodiment of the present invention will be described.

In FIG. 7, the same numerals and letters as those in the first embodiment denote the same members as those in the first embodiment to omit overlapping descriptions.

In FIG. 7, a plurality of quadrilateral dimples 25 is provided circumferentially in a sealing face S of a stationary-side seal ring 5. The dimples 25 do not communicate with the high-pressure fluid side and the low-pressure fluid side. The dimples 25 are each provided independently from each other. The number, the area, and the depth of the dimples 25 are set to optimum values according to the diameter and the face width of the stationary ring 5 and conditions such as the pressure difference between the high-pressure fluid side and the low-pressure fluid side. Nonetheless, dimples with a larger area and a smaller depth are preferable in terms of fluid lubricating action and liquid film formation.

In FIG. 7, as shown by an arrow, a rotating-side seal ring 3 rotationally moves in a counterclockwise direction relative to the stationary-side seal ring 5. When the dimples 25 are formed in the sealing face S of the stationary ring 5, however, there are narrowed gaps (steps) 25a downstream of the dimples 25, and widened gaps (steps) 25b upstream. A fluid interposed between the sealing faces of the stationary-side seal ring 5 and the rotating-side seal ring 3 tries to follow and move in the movement direction of the rotating-side seal ring 3 due to its viscosity, so that, at that time, positive pressure is generated by the presence of the narrowed gaps (steps) 25a, and dynamic pressure (negative pressure) is generated by the presence of the widened gaps (steps) 25b. Thus, positive pressure is generated downstream in the dimples 25, and negative pressure is generated upstream. Then, cavitation occurs in upstream negative pressure generation regions, precipitates form on parts of the negative pressure generation regions, and the precipitates adhere to and deposit on the negative pressure generation regions and a land portion R, which becomes a factor in reducing sealing performance.

Thus, the dimples 25 are covered by a diamond-like carbon film 15 identical to that in the first embodiment.

As the surfaces of the dimples 25 producing positive pressure and negative pressure are covered by the diamond-like carbon film 15, even when a deposit formation-causing substance is precipitated in the dimples 25 due to negative pressure in the vicinities of the widened gaps (steps) 25b, the soil resistance and the low adhesion of the diamond-like carbon film 15 can prevent precipitates from depositing on the surfaces of the dimples 25 and adhering to the land portion R, so that a slide component improved in the sealing function of a sealing face can be provided.

The diamond-like carbon film 15 may be applied only to the upstream negative pressure generation regions instead of to the entire surfaces of the dimples 25.

Fourth Embodiment

Figure 8:
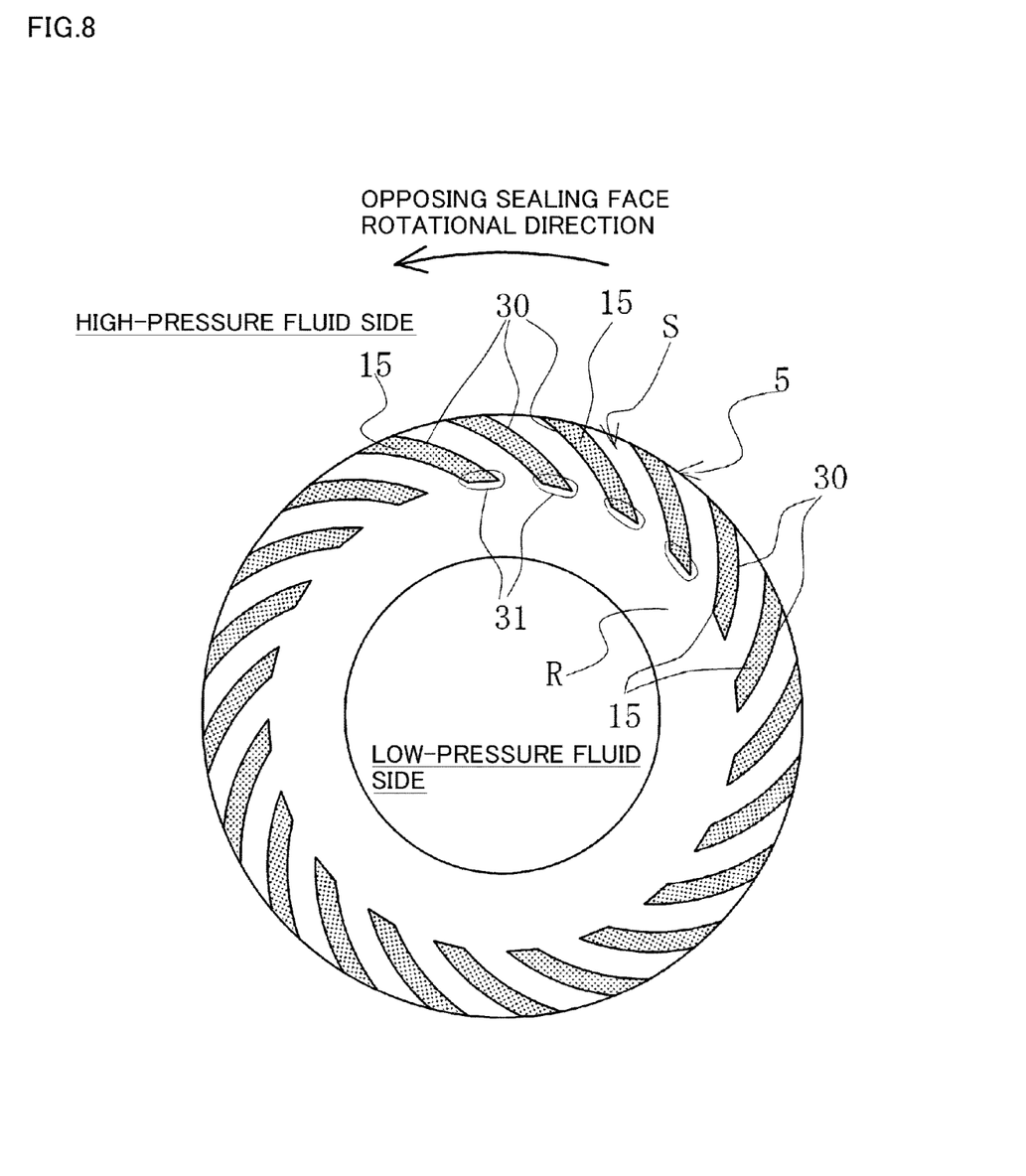
FIG. 8 is a diagram showing pumping grooves constituting negative pressure generation mechanisms according to a fourth embodiment of the present invention.

With reference to FIG. 8, a slide component according to a fourth embodiment of the present invention will be described.

In FIG. 8, the same numerals and letters as those in the first embodiment denote the same members as those in the first embodiment to omit overlapping descriptions.

In FIG. 8, spiral grooves 30 angled to discharge a fluid to the high-pressure fluid side by relative sliding on an opposing sealing face are provided in a sealing face S of a stationary-side seal ring 5, which prevents leakage by forcing back the fluid to the high-pressure fluid side by the viscosity pumping effect of the spiral grooves 30.

Vaporous cavitation can occur in the areas of low pressure fluid-side ends (portions upstream of a fluid flow accompanying relative motion to the opposing sealing face, on the inner peripheral side in FIG. 8) 31 of the spiral grooves 30. When a silicate-based coolant is used as a sealed fluid, for example, precipitates form in the areas of the low pressure fluid-side ends 31 of the spiral grooves 30 in which vaporous cavitation occurs, adhere to and deposit on a land portion R, which becomes a factor in reducing sealing performance.

Therefore, the spiral grooves 30 are covered by a diamond-like carbon film 15 identical to that in the first embodiment.

As the surfaces of the spiral grooves 30 are covered by the diamond-like carbon film 15, even when a deposit formation-causing substance is precipitated in the spiral grooves 30 due to negative pressure in the vicinities of the low pressure fluid-side ends 31, the soil resistance and the low adhesion of the diamond-like carbon film 15 prevent precipitates from adhering to and depositing on the surfaces of the spiral grooves 30 and the land portion R, so that a slide component improved in the sealing function of a sealing face can be provided.

The diamond-like carbon film 15 may be applied only to upstream negative pressure generation regions instead of to the entire surfaces of the spiral grooves 30.

Although the embodiments of the present invention have been described above with the drawings, specific configurations are not limited to the embodiments. Any changes and additions made without departing from the scope of the present invention are included in the present invention.

For example, although the embodiments have been described on an example where a slide component is used for one of a pair of a rotating seal ring and a stationary seal ring in a mechanical seal device, it can be used as a bearing slide component that slides on a rotating shaft, sealing a lubricating oil on axially one side of a cylindrical sealing face.

Further, for example, although the embodiments have been described on a case where a high-pressure sealed fluid is present on the outer peripheral side, they can be applied to a case where a high-pressure fluid is on the inner peripheral side.

Further, for example, although in the embodiments, the reverse Rayleigh step mechanisms 12, the reverse spiral grooves 20, the dimples 25, and the spiral grooves 30 have been described as negative pressure generation mechanisms, which are not limiting. For example, negative pressure generation portions by undulations of a sealing face are included.

Further, for example, although the embodiments have been described on a case where the surfaces of negative pressure generation portions of negative pressure generation mechanisms provided on a sealing face of one of a stationary-side seal ring and a rotating-side seal ring are covered by the diamond-like carbon film 15, the entire sealing face may be coated when coating the entire sealing face is easier to produce in a production process.

Further, for example, an opposing sealing face not provided with negative pressure generation portions may be coated because there is a case where precipitates adhere to and deposit on a land portion R as well as the surfaces of negative pressure generation portions of negative pressure generation mechanisms in a long period of use.

Further, for example, although the embodiments have been described on a case where a film of an adhesion-resistant material applied to the surfaces of negative pressure generation mechanisms is a diamond-like carbon film, which is not limiting. The film only needs to be formed from a material of any one of diamond, fluororesin (PTFE), fluorine, titanium nitride (TiN), and a silicon resin.

REFERENCE SIGN LIST 1 rotating shaft
2 sleeve
3 rotating-side seal ring
4 housing
5 stationary-side seal ring
6 coiled wave spring
7 bellows
10 fluid circulation groove
10a inlet portion
10b outlet portion
10c connection portion
11 positive pressure generation mechanism
11a positive pressure generation groove
11b Rayleigh step
12 reverse Rayleigh step mechanism
12a groove
12b reverse Rayleigh step
15 diamond-like carbon film
20 reverse spiral groove
20a high pressure-side end
21 pressure release groove
22 radial groove
25 dimple
25a narrowed gap (step)
25b widened gap (step)
30 spiral groove
31 low pressure fluid-side end
S sealing face
R land portion

The invention claimed is:

1. A slide component comprising an annular stationary-side seal ring fixed to a stationary side, and an annular rotating-side seal ring that rotates with a rotating shaft, the slide component causing opposed sealing faces of the stationary-side seal ring and the rotating-side seal ring to rotate relatively, thereby sealing a high-pressure fluid present on radially one side, as viewed in a radial direction, of the sliding sealing faces rotatable relative to each other, wherein:

a negative pressure generation mechanism that generates negative pressure by relative rotational sliding of the stationary-side seal ring and the rotating-side seal ring is provided on the sealing face of one of the stationary-side seal ring and the rotating-side seal ring;

a fluid circulation groove constituted by an inlet portion for entry of a sealed fluid thereinto from the high-pressure fluid side, an outlet portion for discharge of the sealed fluid therefrom to the high-pressure fluid side, and a connection portion circumferentially connecting the inlet portion and the outlet portion is provided on the sealing face of the one of the stationary-side seal ring and the rotating-side seal ring;

the sealing face having the negative pressure generation mechanism is provided with a film made of a material, other than titanium nitride (TiN), selected from the group consisting of diamond-like carbon (DLC), diamond, fluororesin (PTFE), fluorine, and a silicon resin as an adhesion-resistant material; and a thickness of the adhesion-resistant material is smaller than a depth of the negative pressure generation mechanism.

2. The slide component according to claim 1, wherein the negative pressure generation mechanism comprises a dimple formed in the sealing face.

3. The slide component according to claim 1, wherein the negative pressure generation mechanism is formed in the sealing face, and comprises a pumping groove that discharges a fluid entering the sealing face to a high-pressure fluid side.

4. The slide component according to claim 1, wherein the negative pressure generation mechanism is provided to be located on a low-pressure side of the sealing face, and comprises a negative pressure generation groove that communicates with a high-pressure fluid side and is separated from a low-pressure fluid side by a land portion.

5. The slide component according to claim 4, wherein the negative pressure generation mechanism comprises a reverse Rayleigh step mechanism.

6. The slide component according to claim 4, wherein the negative pressure generation mechanism comprises a reverse spiral groove.

7. The slide component according to claim 1, wherein a thickness of the adhesion-resistant material is about 0.5 μm.

* * * * *